United States Patent Office 2,980,661
Patented Apr. 18, 1961

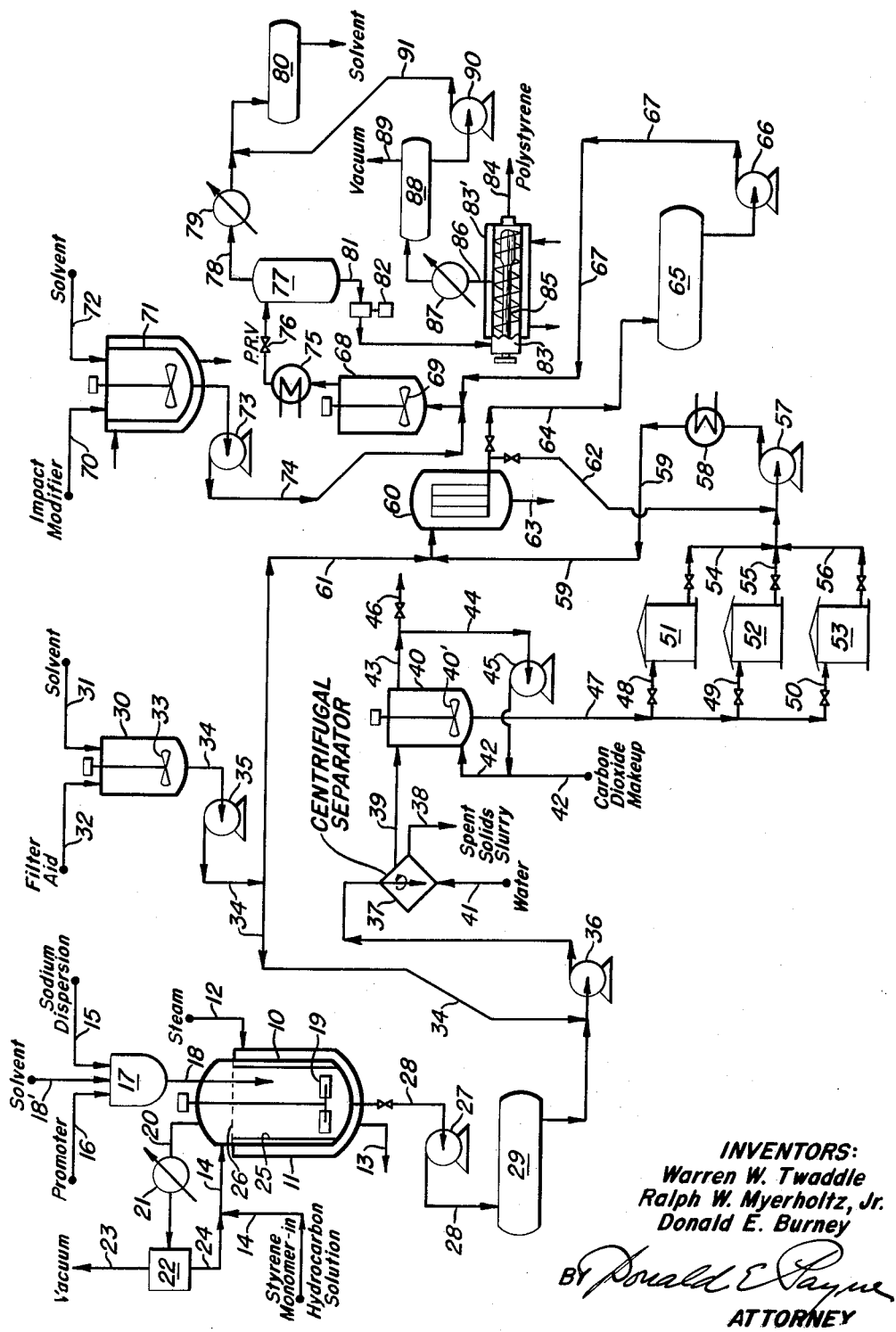

2,980,661

PRODUCTION OF POLYSTYRENE FROM STYRENE-IN-HYDROCARBON SOLUTION

Warren W. Twaddle, Hammond, Ralph W. Myerholtz, Jr., Highland, and Donald E. Burney, Griffith, Ind., assignors to Standard Oil Company, Chicago, Ill., a corporation of Indiana Filed Apr. 3, 1957, Ser. No. 650,330

3 Claims. (Cl. 260—93.5)

This invention relates to improved production of polystyrene from styrene-in-hydrocarbon solution and it pertains more particularly to improvements which enable the production of polystyrene of superior quality by simple processing techniques.

It has recently been shown that polystyrene can be produced by dehydrogenating the ethylbenzene component of a $C_8$ aromatic mixture to form a styrene-in-hydrocarbon solution, purifying the resulting solution and polymerizing the styrene directly from said solution without monomer separation or purification. Molding grade polystyrene cannot be obtained from such solutions by free radical polymerization or polymerization with acid-type (Friedel-Crafts) catalysts. Styrene can be polymerized from such solutions with finely divided dispersed sodium in the presence of a small amount of a promoter such, for example, as a polyether of which 1,2-dimethoxyethane and diethylene glycol dimethyl ethers are examples. An object of this invention is to improve the dispersed sodium polymerization technique for obtaining polystyrene of desired properties regardless of whether the styrene monomer is dissolved in xylene or in some other hydrocarbon diluent such as ethylbenzene, toluene, benzene or even light naphthenic or paraffinic hydrocarbon liquids although the latter lack adequate polymer solvency to permit use of desired monomer concentrations. Another object is to provide improved methods and means for eliminating sodium, polymer gel and color-forming bodies from dissolved polymer. A further object is to provide an improved technique for removing residual solvent from a concentrated polystyrene solution. An important object is to provide an integrated system or processing technique for obtaining uniquely superior polystyrene at minimum investment and operating costs. Other objects will be apparent as the detailed description of the invention proceeds.

In practicing the invention, the styrene-in-hydrocarbon solution may be obtained by dehydrogenating the ethylbenzene content of an ethylbenzene-xylene mixture or by simply incorporating a styrene in a light hydrocarbon solvent, the amount of styrene in the hydrocarbon solution being in the range of about 5 to 40 percent and preferably in the range of about 10 to 30 percent by volume. The hydrocarbon solvent must, of course, be inert under the polymerization conditions and it is preferably ethylbenzene, xylene, toluene, benzene or a mixture thereof. If the solution contains substantial amounts of moisture and/or if it has been stored in the presence of oxygen, it is preferably contacted with an adsorbent such, for example, as a bed of finely ground (60–200 mesh) alumina which has previously been calcined, e.g. for a day or two at a temperature of at least about 480–500° C. Percolation of the styrene-in-hydrocarbon solution through such a high surface area adsorbent may markedly decrease the induction period which would be encountered and may result in the production of higher molecular weight polymers than would otherwise be produced. The solution should contain less than 50 p.p.m. of water and should be substantially free from hydrocarbon oxidation products.

Polymerization of the styrene in the hydrocarbon solution is effected with about .01 to .5, e.g., about .1 to .2 weight percent of finely dispersed sodium promoted by an amount in the range of about .01 to .5, e.g., about .05 to .1 weight percent of a promoter such as a polyether (both percentages being based on styrene) at controlled pressure and at a temperature above about 40° C. but below 120° C. and usually below about 80° C. for a time in the range of about .3 to 3 hours, usually about 90 minutes. The polymerization is preferably effected batch-wise, the sodium being introduced as a dispersion in the hydrocarbon solvent which may, for example, be xylene or benzene. The promoter may be 1,2 - dimethoxyethane or a diethylene glycol dimethyl ether and it is important that this component be added only in promoter amounts, preferably in amounts less than 1 mol per mol of sodium.

The polymer solution as originally produced contains particles of sodium which may be surrounded by very high molecular weight and/or insoluble material herein called a gel. It is desirable to remove this gel as well as unreacted sodium, color bodies, etc. from the polymer solution because the gel may result in the production of "fish-eyes" in a product polymer film or in a polymer of undesirable properties. To remove the gel, sodium, and color bodies from the solution, it is mixed with about 2 to 10 pounds, preferably about 5 pounds, of porous adsorbent solid material such as silica gel, diatomaceous earth, celite, or the like, per pound of sodium in the polymer solution and thereafter the solids are removed from the solution by centrifuging, settling or filtration. The preferred technique is to commingle a slurry of solids with the polymer solution and introduce it into a centrifuge of a type whihc permits addition of water at the periphery thereof so that the water will float the lighter polymer solution from the solids, destroy uncombined sodium and serve as a carrier for the spent solids without being intimately admixed with the solution. Final traces of residual sodium (in any form such as elemental or combined, free, dissolved, or reacted) may be eliminated by treating the solids-free polymer solution with carbon dioxide at about 30 to 100° C. for a period of about .5 to 5 hours or more with an amount of carbon dioxide in the range of about .01 to 1 standard cubic foot of carbon dioxide per gallon of solution. Unless the solution contains a few parts per million of water, the carbon dioxide may be about 1 to 50 percent or more saturated with water. The "sparging" of the solution with carbon dioxide has been found to be remarkably effective for obtaining clear, substantially colorless polymer. Any solids which are formed in the sparging step may be separated in the final clarification filter.

After the carbon dioxide treatment, the solution goes to intermediate storage, different storage vessels being provided for accommodating polymer of various grades and molecular weights. Solution from any intermediate storage vessel may be pumped as desired through a heater to a filter-aid coated filter for final clarification and the clarified solution is then flashed for removing most of the solvent therefrom and give a solution containing 50 percent to 80 percent polystyrene which solution is finally passed through a heated vacuum extruder for substantially eliminating residual solvent. Between the final clarification and flashing steps, a plasticizer or impact modifier is preferably blended therewith since such blending is more uniform and more easily accomplished in the solution stage than in a substantially dry state.

The invention will be more clearly understood from the following detailed description of a preferred example thereof read in conjunction with the accompanying drawing which forms a part of this specification and which is a schematic flowsheet of a system for practicing the invention.

The styrene-in-hydrocarbon solution of this example is one which has been obtained by dehydrogenation of ethylbenzene from a $C_8$ aromatic hydrocarbon fraction followed by purification of the resulting styrene solution so that said solution contains only about 2–10 p.p.m. of water, is substantially free from high boiling tarry materials and is also substantially free from oxidized hydrocarbons. It should be understood that the styrene-in-hydrocarbon solution may be obtained by blending a styrene monomer with an aromatic solvent which may be chiefly ethylbenzene, toluene, and/or benzene. If the solution has been stored in the presence of oxygen, it should be contacted at about 20 to 100° C. with a bed of adsorbent material such, for example, as 200 mesh alumina which has previously been calcined at about 480–500° C. for a period of 1 to 2 days. In this particular example the charging stock to the system has the following composition:

| Component: | Percent by volume |
| --- | --- |
| Benzene | 2.2 |
| Toluene | 7.1 |
| Ethylbenzene | 6.1 |
| Xylenes | 66.9 |
| Styrene | 17.7 |

The entire polymerization system comprises three pairs of reactors so that polymers of different properties may be made but in the drawing only one reactor is shown. This reactor, which receives a 4,000 gallon charge, is a stainless steel 8 foot diameter vessel 10 which is surrounded by steam jacket 11 so that 100 pound steam may be introduced through line 12 and withdrawn through line 13. The defined styrene solution is introduced into the reactor through line 14. A 20 percent fine dispersion of sodium in xylenes is introduced through line 15 employing 27.7 pounds per reactor charge and 2.77 pounds of the polyether promoter, 1,2-dimethoxyethane, is likewise employed perreactor charge and introduced through line 16. The catalyst and promoter are introduced via weigh tank 17 and line 18. Solvent may likewise be introduced at this point through line 18' and we prefer to employ a 10 pound xylene rinse after addition of catalyst and promoter to each reactor charge.

Preferably the styrene-in-hydrocarbon solution is first introduced into reactor 10, the impeller type stirrer 19 is started and the desired polymerization temperature is established which in this case is 72° C. The pressure on the system is then reduced to about 75 millimeters of mercury by withdrawing vapors through line 20 and cooler 21 to receiver 22 which in turn is connected by evacuation line 23 to an evacuating pump or steam jet. Condensate is returned from receiver 22 through lines 24 and 14 back to the reaction vessel. When the desired temperature and pressure conditions have thus been established, the catalyst and promoter is added to the reactor and vigorous stirring is continued. The reactor vessel is provided with vertical anti-swirl baffles 25 and with a wire mesh entrainment arrester 26.

After about 15 minutes for introducing charge and 15 minutes for establishing the desired vacuum, the polymerization is effected for a period of about an hour and a half. A proper sizing of elements 20—24 will enable the temperature to be maintained at aobut 72° C. as the polymerization proceeds, although some temperature rise is tolerable during the first few minutes of the polymerization. The amount of catalyst and promoter should be sufficiently small so that the monomer conversion per minute is less than 20 percent of the total monomer and in this example a 98 percent polymer yield is obtained in 1.5 hours. It should be understood that the styrene may be polymerized from benzene or other light hydrocarbon and that the pressure required for maintaining a given temperature will depend upon the nature of the solvent hydrocarbon which was employed. If desired, only a part of the reactor charge is introduced initially and the remainder of the reactor charge is added after the polymerization has been initiated.

After the polymerization, a sample is withdrawn and tested to determine the particular intermediate blending or storage tank to which the solution is to be transferred and the solution is discharged by pump 27 through line 28 to surge tank 29 where it may be held while another batch is being charged to reaction vessel 10. The solid adsorbent slurry is prepared in vessel 30 by introducing xylene through line 31 and silica gel or other adsorbent solid through line 32 and forming a slurry by means of mixer 33. An amount of this slurry is withdrawn through line 34 by pump 35 sufficient to provide about 5 pounds of the solid adsorbent per pound of sodium in the solution withdrawn from the base of surge tank 29. The mixture of solution and adsorbent solid is pumped by pump 36 to separator 37 for separating spent solids through line 38 from clarified solution which is withdrawn through line 39 to treating vessel 40. Separator 37 may be a filter, a settler or a centrifugal separator; preferably it is a centrifugal separator of the type which permits the introduction of water through line 41 at the bottom so that the added water will not be intimately contacted with the polymer solution but will float the lighter polymer solution from the solids, destroy uncombined sodium continuously in situ, and serve as a carrier for the spent solids and sodium removed. Hydrogen evolved will escape with the polymer solution and be separated therefrom downstream in the system. The introduction of water at the base of the centrifuge (which may be of the Door-Oliver Merco type) is advantageous for the further reason that it minimizes loss of polymer solution with spent solid and it effectively destroys sodium after its separation from the solution.

In treating vessel 40, which may be provided with a stirrer or mixing means 40', the polymer solution is intimately contacted with carbon dioxide which is introduced through line 42. This treatment may be at about 50° C. with about .3 standard cubic foot of carbon dioxide per gallon of solution, the carbon dioxide in this case being about 30 percent saturated with water. Unreacted carbon dioxide is withdrawn from the upper part of vessel 40 through line 43 and most of it is recycled by line 44 and circulator 45 although a part may be vented through line 46 (e.g. to prevent buildup of hydrogen from upstream treatment of sodium with water). In this example the treatment with $CO_2$ was effected for a period of three hours although usually a shorter treating time is adequate.

The treated solution next passes by line 47 and branch line 48, 49 or 50 to one of the vessels 51, 52 or 53. A plurality of these vessels is employed so that each vessel may contain a solution of a polymer of given desired properties and each batch of polymer is therefore charged to the proper storage tank for blending or storage. When finished polymer is desired, a solution is withdrawn from the appropriate tank through line 54, 55 or 56 and passed by pump 57 through preheater 58 and line 59 to filter 60 which has previously been precoated by silica gel, celite or other filter-aid material introduced by line 61. If the initial filtrate is cloudy, it may be recycled by line 62 to the inlet of pump 57. This final filtration step removes any solids which may result from the carbon dioxide treatment and the filtration is usually effected at a temperature of about 90 to 100° C., the spent solids being removed through line 63.

The clean polymer solution is withdrawn through line 64 to surge tank 65 from which it is introduced by pump 66 and line 67 to mixer 68 which is provided with stirrer 69. Plasticizer or impact modifier materials may be introduced by line 70 into steam jacketed mixing vessel 71 together with solvent from line 72 and the resulting solution or suspension may be passed by pump 73 and line 74 to mixing vessel 68. The mixing of the plasticizer, rubber, or other impact modifier directly with the styrene-in-hydrocarbon solution is much simpler and more effective than milling plasticizer and/or modifier with finished dry polymer.

The final solution is next passed through heater 75 through pressure reducing valve 76 to flash drum 77 so that solution heated to about 270° C. under a pressure of 300 p.s.i.g. is flashed to about 5 p.s.i.g. The flashing removes about 86 percent of the solvent which passes through line 78 and condenser 79 to solvent receiver 80. The 60 percent solution of polymer in xylene withdrawn from the base of flash chamber 77 through line 81 is metered by pump 82 into heated vacuum extruder 83 which may be surrounded by heating jacket 83′ and which is specially designed to remove substantially all solvent from the final polystyrene product before it is discharged at 84. In the intermediate part of the extruder, the central portion of shaft 85 is of small diameter so that a large space is left between the shaft and the lateral walls of the extruder. At the outlet end of the extruder the shaft diameter is large so that the extruded polystyrene forms a seal. One or more screw flights on the shaft cause the introduced solution to pass from the inlet to the outlet end of the vacuum extruder and to be discharged through a die in the form of strands of polystyrene. A high vacuum is maintained in the intermediate portion of the extruder, vapors being removed therefrom through large line 86 which leads to cooler 87, receiver 88 and evacuating line 89. Condensate from receiver 88 is introduced by pump 90 and line 91 to solvent storage tank 80. Two stages of evacuation may be employed by using a central seal in the vacuum extruder as well as the two end seals and adding an additional evacuation line. The heated vacuum extruder as hereinabove described differs from vacuum extruders heretofore known to the art in that (1) it is designed to receive a pumped or metered amount of a liquid solution rather than to receive solids, (2) the central shaft 85 is of small diameter and is widely spaced from the heated walls at the inlet end as well as at the intermediate end of the extruder, and (3) the vapor outlet line 86 is enormously larger than any vapor outlet heretofore employed in such devices since it must remove an enormous amount of vapor at low pressure. Devolatilization temperatures employed in the vacuum extruder are usually of the order of 200 to 300° C., i.e., high enough for producing dry polymer but low enough to prevent polymer degradation. As high a vacuum should be maintained in the extruder as is economically feasible, such pressure being, for example, in the range of about 15 to 150 millimeters of mercury absolute.

The screw diameters of the extruders may range from about 2 to 12 inches providing capacities in the range of about 50 to 4000 pounds of polymer per hour. A 60 percent polystyrene solution can easily be pumped into the inlet of the extruder at a temperature in the range of about 120 to 150° C.; it should be understood, of course, that this concentration is approximate and may be somewhat higher depending on the effectiveness of the preliminary vapor separation step. The inlet part to the vacuum extruder may be approximately the diameter of the extruder screw and the vapor outlet is preferably equal or somewhat larger in cross-sectional area, said inlet and outlet being connected by gas tight seals to lines 81 and 86, respectively. To minimize the escape of polymer along with vapors, the vapor outlet passes on a vertical axis through the heated wall, has a rectangular cross-section about one-half screw diameter wide and one and a half screw diameters long, is located with its length parallel to the axis of the screw, and positioned over the side of the screw which in rotation sweeps downward along the heated wall. The distance between shaft 85 and the inner walls of the extruder may be about .4 to 4 inches at the inlet and intermediate end of the extruder but is preferably less than .2 inch at its large diameter downstream end. The screw may be driven at a rate of about 20 to 100 r.p.m. It appears that a mass of concentrated polymer solution is carried forward ahead of the leading surface of the screw leaving a space between said mass and the trailing surface of the screw through which space the liberated solvent vapors pass at high velocity to the vapor discharge line 86. A plurality of such vacuum extruders may be employed in series and/or in parallel; a multistage drying by vacuum extrusion may be effected by providing a plurality of vapor outlets and providing an enlarged shaft diameter ahead of each vapor outlet for maintaining the required seal.

In this particular example the xylenes from solvent tank 80 may be treated with clay and subsequently marketed as aromatic solvents or as gasoline blending components.

The polystyrene produced as hereinabove described may range from brittle resins to very high molecular weight plastics depending on the particular reaction conditions chosen. Typically, they have intrinsic viscosities of from .2 to 2. They contain little, if any, free monomeric styrene and essentially no peroxy or carbonyl structures which are normally formed in peroxide-catalyzed polymerization of styrene. The polystyrene as hereinabove produced is characterized by narrower molecular weight distribution than polystyrenes heretofore produced by conventional methods. They are essentially free from gel fractions which might cause difficulty in extrusion and they are remarkably homogeneous and uniform. Since internal lubricants and other additives may be added to the polymer solution, the choice of such materials need not be restricted to substances which do not interfere with the polymerization reaction. Illustrative physical properties of polystyrenes made in the manner hereinabove described are shown in the following table:

| Property | Test Method | Styrene Polymer (Nothing added) | Styrene Polymer [1] |
|---|---|---|---|
| Intrinsic Viscosity | [2] | 1.06 | 1.06 |
| Melt Viscosity, poise at Low Shear. | [3] | $2.8 \times 10^7$ | $1.2 \times 10^7$ |
| Melt Viscosity, poise at High Shear. | [4] | 625 | 435 |
| Volatile Content, Percent | [5] | 0.40 | 0.77 |
| Melt Index, g./10 min. | [6] | 0.298 | 0.455 |
| Tensile Strength, p.s.i. | ASTM D 638 | 7,450 | 6,630 |
| Tensile Modulus, p.s.i. | ASTM D 638 | 345,000 | 388,000 |
| Tensile Elongation, percent | ASTM D 638 | 5.0 | 2.1 |
| Flexural Strength, p.s.i. | ASTM D 790 | 13,000 | 10,600 |
| Flexural Modulus, p.s.i. | ASTM D 790 | 463,000 | 460,000 |
| Izod Impact Strength, ft. lb./in. | ASTM D 256 | 0.25 | 0.22 |
| Heat Distortion Temp., °C. | ASTM D 648 | 87.0 | 83.5 |
| Rockwell Hardness | ASTM D 785 | 81.6 | 82.1 |
| Dielectric Constant (1 mc.) | ASTM D 150 | 2.60 | |
| Power Factor (1 mc.) | ASTM D 150 | 0.0002 | |
| Water Absorption, Percent | ASTM D 570 | 0.06 | |

[1] With 2% butyl benzyl phthalate added to solution before vacuum extrusion.
[2] Intrinsic viscosity measured in toluene at 30° C.
[3] Melt viscosity at low shear measured in parallel plate plastometer at 145° C. by method of Dienes and Klemm.
[4] Melt viscosity at high shear measured in extrusion plastometer at 200° C. through 1/32″ diameter × 0.236″ die at shear stress of $3.39 \times 10^6$ dynes/cm.$^2$.
[5] Volatile content determined by heating 8-35 mesh granules at 165° C. for 3½ hrs. at 5 mm pressure.
[6] 190° C. load 2160 g.

It will thus be seen that the objects of the invention have been attained. While a particular example of the invention has been described in considerable detail, it should be understood that alternative arrangements and operating conditions will be apparent from the foregoing description to those skilled in the art. Alpha methyl styrene or other styrene monomers may of course be polymerized in place of or in combination with styrene itself.

We claim:
1. In a process for preparing molding grade polystyrene by contacting a solution of a styrene monomer in a light aromatic hydrocarbon solvent with an amount of dispersed sodium in the range of 0.01 to 0.5 weight percent and an amount of a promoter also in the range of about 0.01 to 0.5 weight percent, both based on styrene monomer at a temperature in the range of about 40° to 120° C., the improvement which comprises the steps of initially contacting the styrene solution with a bed of alumina which has been previously calcined for a substantial period at a temperature of at least about 480° C. to remove oxygenated hydrocarbons as well as moisture from said solution prior to said contacting, mixing about 2 to 10 pounds of porous adsorbent solid material selected from the groups consisting of silica gel, diatomaceous earth and celite per pound of sodium in the polymer solution after said contacting and separating the added solids for removing sodium, color bodies and polymer gel, treating the solution after solids removal with carbon dioxide for eliminating color formation by any residual sodium and recovering a polystyrene product from said solution having an intrinsic viscosity of from 0.2 to 2 and having substantially no peroxy or carbonyl structures in the polymer molecule.

2. Process of claim 1 wherein the alumina has a particle size of 60–200 mesh.

3. The method of claim 1 wherein the treatment with carbon dioxide is at a temperature of about 30 to 100° C. for a time of at least about one-half hour with an amount of carbon dioxide in the range of about .01 to 1 standard cubic foot thereof per gallon of solution.

References Cited in the file of this patent

UNITED STATES PATENTS

| | | |
|---|---|---|
| 2,327,082 | Walker | Aug. 17, 1943 |
| 2,405,480 | Wilde | Aug. 6, 1946 |
| 2,530,409 | Stober et al. | Nov. 21, 1950 |
| 2,565,960 | Garber et al. | Aug. 28, 1951 |
| 2,577,677 | Crouch | Dec. 4, 1951 |
| 2,615,199 | Fuller | Oct. 28, 1952 |
| 2,714,101 | Amos et al. | July 26, 1955 |
| 2,745,824 | Melchore | May 15, 1956 |
| 2,829,399 | Carracciolo et al. | Apr. 8, 1958 |
| 2,849,429 | Cines | Aug. 26, 1958 |